United States Patent [19]

Bone

[11] Patent Number: 4,516,044

[45] Date of Patent: May 7, 1985

[54] HEAT EXCHANGE APPARATUS FOR ELECTRIC MOTOR AND ELECTRIC MOTOR EQUIPPED THEREWITH

[75] Inventor: Kendall F. Bone, Cincinnati, Ohio

[73] Assignee: Cincinnati Milacron Inc., Cincinnati, Ohio

[21] Appl. No.: 615,610

[22] Filed: May 31, 1984

[51] Int. Cl.[3] ............................................. H02K 9/00
[52] U.S. Cl. .................................... 310/64; 165/169; 310/54
[58] Field of Search ...................... 310/54, 55, 57–59, 310/60 A, 62–64, 89; 165/169, 47

[56] References Cited

U.S. PATENT DOCUMENTS

| | | | |
|---|---|---|---|
| 3,097,317 | 7/1963 | Fechheimer | 310/54 |
| 3,173,479 | 3/1965 | Heuer | 165/169 |
| 3,184,624 | 5/1965 | Solomon | 310/90 |
| 3,447,002 | 5/1969 | Ronnevig | 310/54 |
| 3,480,810 | 11/1969 | Potter | 310/54 |
| 3,521,094 | 7/1970 | Renz et al. | 310/58 |
| 3,567,975 | 3/1971 | Blesack | 310/54 |
| 3,597,645 | 8/1971 | Duffert et al. | 310/54 |
| 3,963,950 | 6/1976 | Watanabe et al. | 310/54 |
| 4,250,418 | 2/1981 | Eckels | 310/64 |
| 4,262,224 | 4/1981 | Kofink et al. | 310/54 |

OTHER PUBLICATIONS

Cincinnati Milacron Inc., engineering drawings, No. KC 40910380M-Spindle Housing and No. KA 41302382M-Assembly.

Primary Examiner—William H. Beha, Jr.
Assistant Examiner—D. L. Rebsch
Attorney, Agent, or Firm—Donald Dunn

[57] ABSTRACT

The cooling of an electric motor is achieved by a heat exchange apparatus having a cylindrical wall containing a continuous path fluid (e.g., liquid) passageway providing turbulent flow to a conveyed cooling fluid. Turbulent flow of the cooling fluid is obtained by the passageway's having a plurality of curvilinear passageway segments lengthwise oriented normal to the longitudinal axis of the cylindrical wall, connected together in pairs by passageway sections lengthwise oriented normal to the passageway segments and parallel to the longitudinal axis of the cylindrical wall.

2 Claims, 8 Drawing Figures

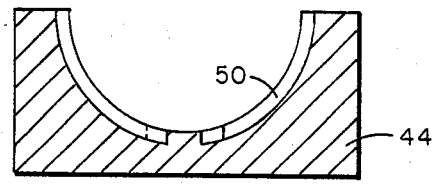
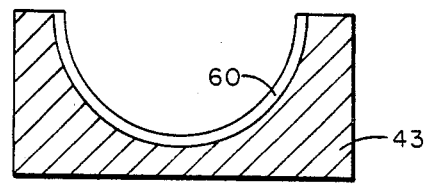
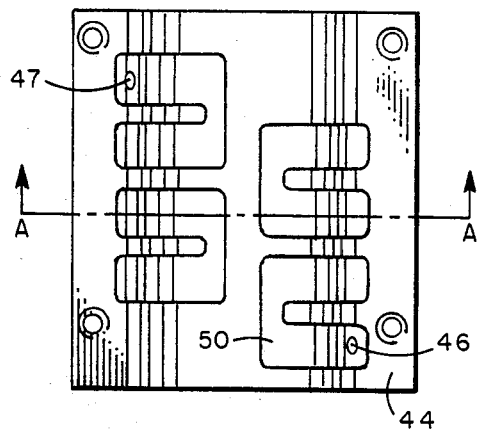
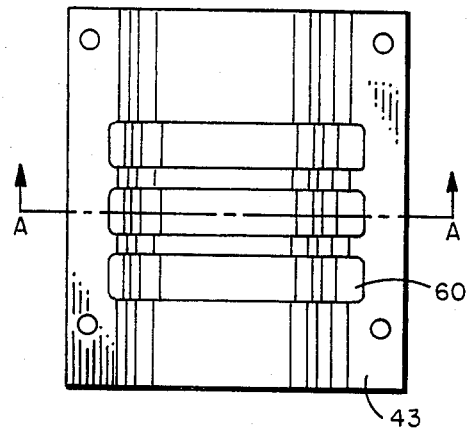
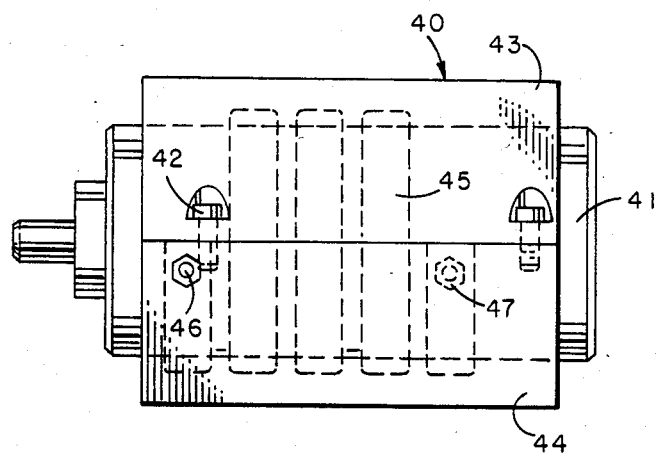

HEAT EXCHANGE APPARATUS FOR ELECTRIC MOTOR AND ELECTRIC MOTOR EQUIPPED THEREWITH

FIELD OF INVENTION

This invention relates to an apparatus for cooling an electric motor. More particularly this invention pertains to a housing having a heat exchange fluid channel for encasing an electric motor, to remove heat generated by the motor during its operation. In another aspect this invention relates to an electric motor having a non-spiral heat exchange fluid channel for passing a heat exchange fluid to remove heat produced by the electric motor during its operation.

BACKGROUND

Electric motors are well known to produce heat during their operation. Usually the amount of heat produced increases with the increasing horsepower of the electric motor. This heat causes break down of the insulation of the wiring, reduces the efficiency of the motor, causes deterioration of non-metallic components such as seals and can produce premature failure of metallic parts of the motor. The heat generated by the electric motor may even adversely effect things in the immediate vicinity of the motor. As the demand grows for higher horsepower electric motors in such applications as machine tools, the problem of heat dissipation increases. The problem of removing heat from electric motors has been previously attacked in a variety of ways. For example fins have been used on motor casings to dissipate heat, fans have been incorporated inside electric motors for air cooling and air circulation patterns of numerous designs inside electric motors have been proposed and used. Liquid e.g. oil cooling of electric motors is known. Where liquid cooling of an electric motor has been used, the motor has been provided with a heat exchange jacket having passageways for the circulation of the liquid through the jacket. Although many of such passageway geometries are effective for cooling the electric motor, they are difficult and costly to produce. Thus, they often add significant cost to the motor.

For electric motors that are both relatively small in size and high in horsepower the removal of heat is a particularly important problem, especially when trying to maintain the small size of the motor. The problem of heat removal in a small, high horsepower electric motor is aggravated by totally enclosing the motor to protect it from various components of the environment in which it is operated, e.g. in machine tools. Such relatively small, high horsepower electric motors equipped with a close fitting ccooling jacket having a spiral fluid passageway for conducting a cooling fluid (e.g. oil or water) are known and have been used in machine tools made by Cincinnati Milacron Inc. The fluid flow path in the spiral passageway gradually and continuously changes direction producing little or no turbulent flow of the fluid, and thus reduced cooling efficiency. Further, producing the spiral passageway in the jacket is difficult and costly. It is, therefore, desirable to provide a fluid flow path geometry that produces turbulent fluid flow, that is easy to produce and is of low cost, in a heat exchange jacket for an electric motor.

It is an object of this invention to provide a heat exchange apparatus for cooling an electric motor, including a fluid flow path geometry producing turbulent fluid flow. A further object of this invention is to provide an electric motor having a fluid flow passageway geometry producing turbulent flow of a heat exchange fluid to improve heat dissipation from the motor.

SUMMARY OF THE INVENTION

The above abjects and others as will be apparent from the following description and appended claims are achieved with the practice of this invetion. In accordance with this invention there is now provided a heat exchange apparatus for cooling an electric motor comprising a wall defining a cylindrical cavity having a longitudinal axis, said wall having a continuous path fluid passageway comprising a plurality of parallel curvilinear passageway segments normal to the longitudinal axis connected together in pairs by passageway sections oriented normal to the curvilinear passageway segments and parallel to the longitudinal axis. There is also provided in accordance with this invention an electric motor having a longitudinal axis comprising (1) a stator, (2) a rotor and (3) a heat exchange, continuous path fluid passageway comprising a plurality of parallel curvilinear passageway segments normal to the longitudinal axis connected together in pairs by passageway sections oriented normal to the curvilinear passageway segments and parallel to the longitudinal axis.

BRIEF DESCRIPTION OF THE DRAWINGS

FIG. 4 shows an alternate embodiment.

FIG. 5 shows an interior plan view of the lower member of an alternate embodiment of the heat exchange apparatus.

FIG. 5(a) shows a sectional view taken along line A—A of FIG. 5.

FIG. 6 shows an interior plan view of the upper member of the alternate embodiment of the heat exchange apparatus.

FIG. 6(a) shows a sectional view taken along line A—A of FIG. 6.

DETAILED DESCRIPTION OF THE INVENTION

This invention provides an apparatus for improved cooling of an electric motor by a circulating heat exchange fluid, more especially a liquid. The improved cooling is obtained by the high turbulence in the circulating fluid produced by the tortuous geometry of the fluid passageway of the heat exchange apparatus according to this invention. This improved cooling enhances the performance and life of the electric motor. Additionally the fluid passageway of the heat exchange apparatus and electric motor in accordance with this invention is comparatively easy to produce, especially by casting methods, particularly when compared to a spiral fluid passageway and heat exchange apparatus having a spiral fluid passageway, and thus reduces the cost of making the heat exchange apparatus and electric motor.

The heat exchange apparatus in accordance with this invention comprises a wall defining a cylindrical cavity having a longitudinal axis and in the wall a continuous path fluid passageway comprising a plurality of parallel curvilinear passageway segments lengthwise oriented normal to the longitudinal axis connected together in pairs by passageway sections oriented normal to the passageway segments and parallel to the longitudinal axis. In one aspect of the practice of the heat exchange apparatus of this invention the wall defining the cylindrical cavity is one piece circumferentially and longitudinally, e.g. a tube shape. This single piece wall, in which there is the continuous path fluid passageway, fits securely over the electric motor in close contact with the exterior of the electric motor housing to obtain good transfer of heat to the heat exchange apparatus. In another aspect of the practice of the heat exchange apparatus according to this invention the wall defining the cylindrical cavity may be two close fitting semi-circular pieces which bolt together to form the cylindrical cavity while the portions of the fluid passageway in each half wall (i.e. semi-circular piece) mate to form the continuous path fluid passageway. As with the single piece wall forming the cylindrical cavity, this two piece wall embodiment is secured in close contact to the exterior of the electric motor housing.

Figure 1:
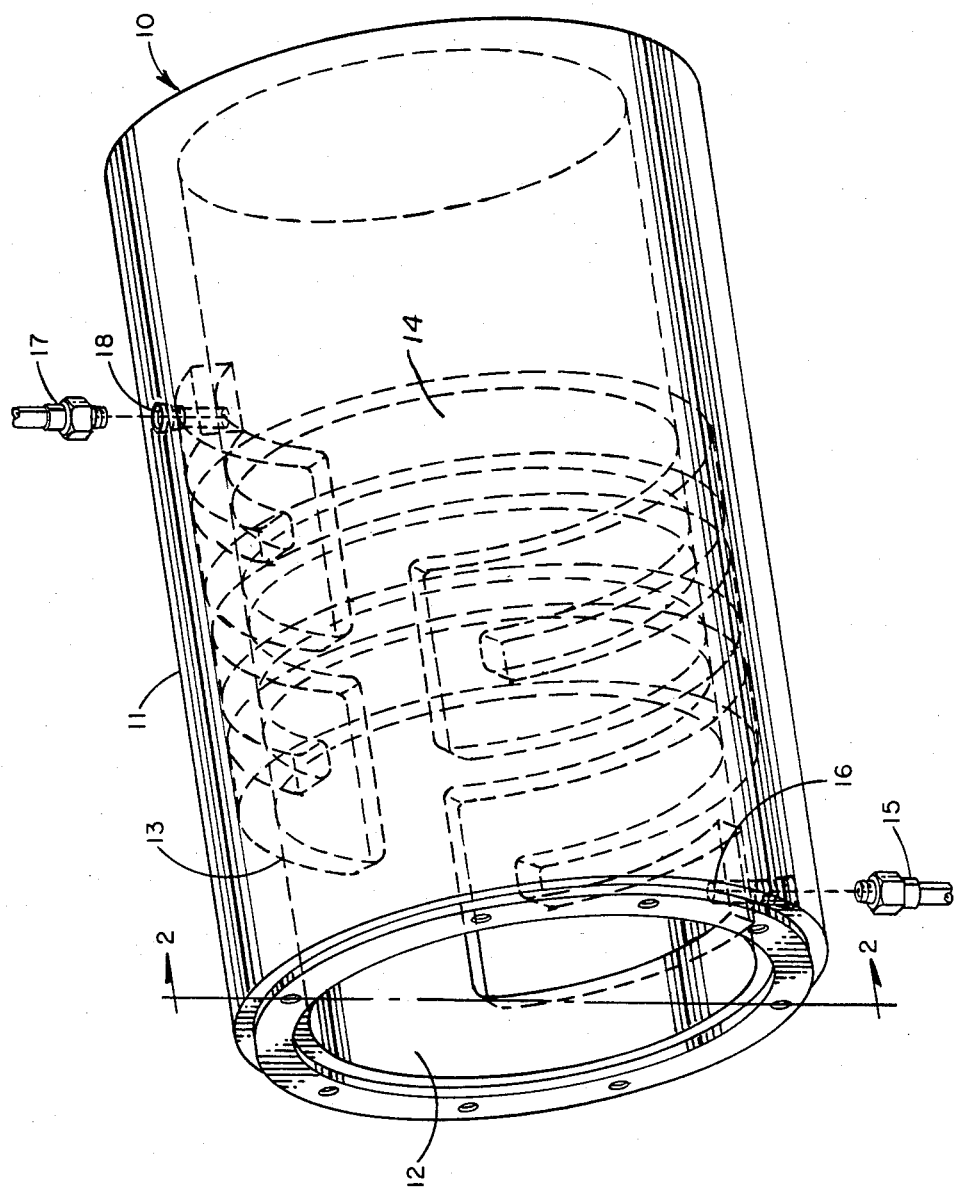
FIG. 1 shows an isometric view of a heat exchange apparatus and continuous path fluid passageway.
Figure 2:
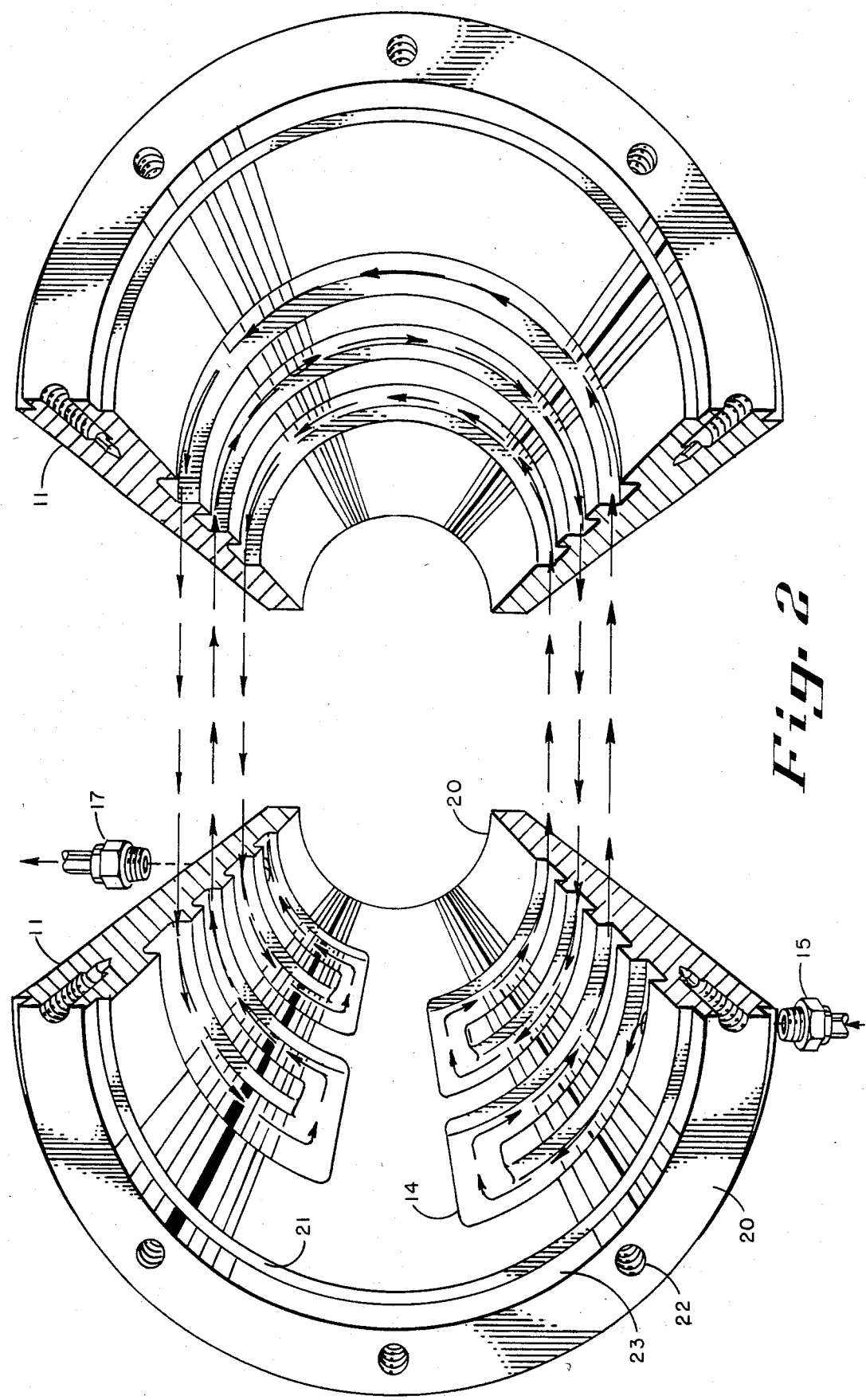
FIG. 2 shows an exploded sectioned view of the apparatus shown in FIG. 1.

This invention is now furhter described with references to the drawings. FIG. 1 shows, in an isometric view, a heat exchange apparatus 10 according to this invention for fitting over an electric motor. Wall 11 of heat exchange apparatus 10 defines cylindrical cavity 12 into which an electric motor (not shown) is inserted for close contact with interior surface 13 of wall 11. In surface 13 of wall 11 is the continuous path fluid passageway 14 for conveying a heat exchange fluid e.g. a liquid, more particularly water or oil, for cooling the electric motor (not shown) in cavity 12. The cooling fluid is supplied to passageway 14 through fitting 15 attached to the threaded inlet 16 in wall 11 communicating with passageway 14. Heat exchange (e.g. cooling) fluid exits the heat exchange apparatus through fitting 17 attached to threaded outlet 18 in wall 11 communicating with passageway 14. The exterior surface of the housing of the electric motor, not shown, inserted into cavity 12 and fitting closely against interior surface 13 of wall 11 in combination with passageway 14, forms an enclosed passageway for conveying a heat exchange (i.e. cooling) fluid (e.g. water or oil) to remove heat from the electric motor. To conserve the heat exchange fluid, the fluid is preferably recirculated to the heat exchange apparatus of this invention. Turning now to FIG. 2 there is shown in an exploded view two halves of heat exchange apparatus 10 taken in section along line 2—2 of FIG. 1. The fluid flow pattern in passageway 14 is shown by the arrows in FIG. 2. Heat exchange apparatus 10 is preferably used in conjunction with two shaft accomodating end plates (not shown) to provide a total enclosure for the electric motor (not shown) and to complete the sealing of heat exchange apparatus 10 to the exterior surface of the housing of the electric motor. Both end faces 20 of wall 11 of heat exchange apparatus 10 have a circular O-ring receiving channel 21 for retaining an O-ring in cooperation with the end plate and the housing of the electric motor to seal wall 11 to the exterior surface of the housing of the electric motor. The end plate is attached to the end of wall 11 by bolts threaded into holes 22 in projection 23 on face 20 of the end of wall 11.

Figure 3:
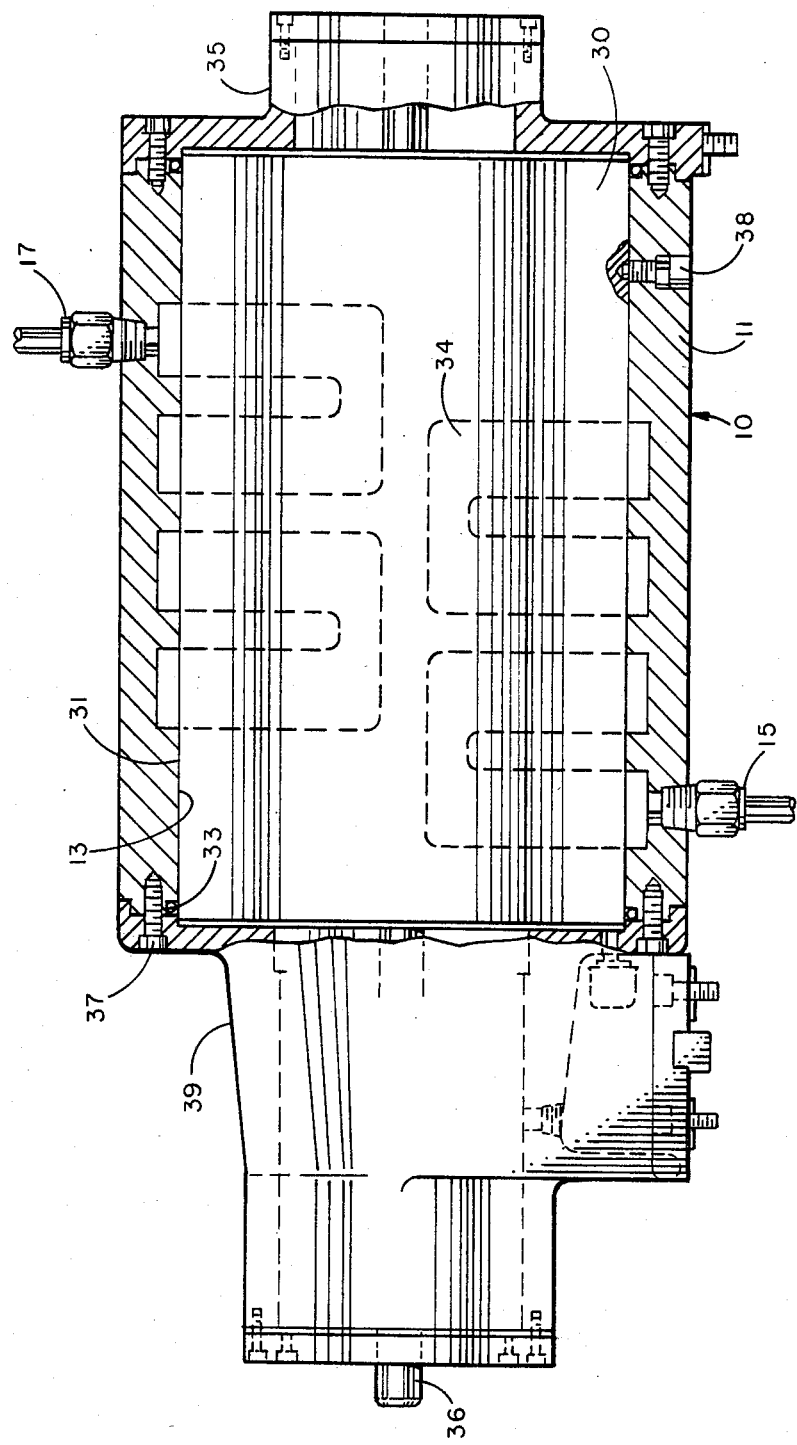
FIG. 3 shows in partial cross section an electric motor having the heat exchange apparatus.

A preferred practice of this invention is shown in FIG. 3 in partial section, using the heat exchange apparatus shown in FIGS. 1 and 2 in combination with an electric motor. The wall 11 of heat exchange apparatus 10 fits over the motor 30 in close contact with the exterior surface 31 of the housing of motor 30 to form, in combination with passageway 14 of wall 11 of heat exchange apparatus 10, an enclosed heat exchange fluid conduit 34, shown partially in phantom. Sealing of the inside surface 13 of wall 11 against the motor housing to prevent the heat exchange fluid from getting into the motor 30 is achieved by an O-ring 33 compressed in channel 21 of the end face of wall 11. Front cap 39 and rear cap 35 containing bearings, not shown, for shaft 36 are attached to the end faces 20 of wall 11 by bolts 37 to totally enclosed motor 30. Set screw 38 in wall 11 prevents rotation of motor 30 with respect to wall 11. Heat exchange fluid (e.g. water or oil) enters heat exchange apparatus 10 through fitting 15 threaded into opening 16 of wall 11 communicating with conduit 34 and flows through conduit 34 to exit through opening 18 in wall 11 and fitting 17 threaded into opening 18.

An alternate embodiment of the heat exchange apparatus and electric motor in accordance with this invention, in the form of a two piece heat exchange apparatus 40 assembled and surrounding motor 41, is shown in FIG. 4. Bolts 42 join together the two halves, i.e. upper half 43 and lower half 44, to form a continuous path passageway 45 having inlet opening 46, through which a heat exchange fluid enters passageway 45, and an exit opening 47 through which a heat exchange fluid leaves passageway 45. A gasket, not shown, seals the seam between the assembled upper half 43 and lower half 44 of heat exchange apparatus 40 without interfering with the continuity of passageway 45 to prevent loss of heat exchange fluid from the apparatus. To seal the heat exchange apparatus 40 against the exterior of the motor there can be used a gasket, not shown, such as for example an O-ring to prevent loss of heat exchange fluid from between the heat exchange apparatus 40 and electric motor 41. Lower half 44 of heat exchange apparatus 40 is shown in further detail in FIG. 5. The portion 50 of passageway 45 in lower half 44 has a block geometry whose one leg is shown in cross-section in FIG. 5ais taken along line A—A FIG. 5. Upper half 43 of heat exchange apparatus 40 is shown in further detail in FIG. 6. Parallel curvilinear portions 60, shown straight in FIG. 6, connect with pairs of opposing legs of the block geometry portions 50 of passageway 45, see FIG. 5, to form a continuous path passageway for the flow of heat exchange fluid in heat exchange apparatus 40. A cross-section of portion 60 of passageway 45, taken along line A—A of FIG. 6, is shown in FIG. 6(a).

In accordance with the practice of this invention there is provided an electric motor comprising a housing having a wall defining a cylindrical cavity having a longitudinal axis, said wall having (1) a continuous path fluid passageway comprising a plurality of parallel curvilinear passageway segments normal to the longitudinal axis connected together in pairs by passageway sections oriented normal to the passage way segments and parallel to the longitudinal axis, (2) a fluid inlet means communicating with the passageway and (3) a fluid outlet means communicating with the passageway. An electric motor having an integral heat exchange apparatus in accordance with this invention is thus provided.

A principle objective of this invention is to cool an electric motor by a cost effective efficient apparatus and method. Thus the cooling fluid used in the apparatus according to this invention is usually a liquid, and more particularly water or oil. Preferably the liquid is recirculated, and more preferably the liquid is cooled and recirculated through the heat exchange apparatus according to this invention.

Conventional metal casting methods may be used in making the heat exchange apparatus in accordance with this invention.

What is claimed is:

1. A heat exchange apparatus for cooling an electric motor comprising a wall defining a cylindrical cavity having a longitudinal axis wherein the wall comprises a continuous path fluid passageway for conveying a heat exchange fluid comprising a plurality of parallel circumferentially incomplete curvilinear passageway segments lengthwise oriented normal to the longitudinal axis connected together at their extremes in pairs by passageway sections lengthwise oriented normal to the passageway segments and parallel to the longitudinal axis, a fluid inlet means communicating with the passageway and a fluid outlet means communicating with the passageway.

2. An electric motor comprising a housing having a wall defining a cylindrical cavity having a longitudinal axis wherein the wall comprises (1) an enclosed continuous path fluid passageway for conveying a heat exchange fluid comprising a plurality of parallel circumferentially incomplete curvilinear passageway segments lengthwise oriented normal to the longitudinal axis connected together at their extremes in pairs by passageway sections lengthwise oriented normal to the passageway segments and parallel to the longitudinal axis, (2) a fluid inlet means communicating with the passageway and (3) a fluid outlet means communicating with the passageway.

* * * * *